US009733555B2

(12) United States Patent
Takizawa et al.

(10) Patent No.: US 9,733,555 B2
(45) Date of Patent: Aug. 15, 2017

(54) ILLUMINATION DEVICE AND PROJECTOR

(71) Applicant: Seiko Epson Corporation, Tokyo (JP)

(72) Inventors: Takahiro Takizawa, Suzaka (JP);
Fumihide Sasaki, Azumino (JP);
Yukihiro Horiko, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/174,257

(22) Filed: Jun. 6, 2016

(65) Prior Publication Data
US 2016/0363848 A1    Dec. 15, 2016

(30) Foreign Application Priority Data

Jun. 11, 2015  (JP) .................................. 2015-118086

(51) Int. Cl.
G03B 21/16     (2006.01)
G03B 21/20     (2006.01)
G03B 21/00     (2006.01)
G03B 21/12     (2006.01)

(52) U.S. Cl.
CPC ........... *G03B 21/16* (2013.01); *G03B 21/006* (2013.01); *G03B 21/12* (2013.01); *G03B 21/2013* (2013.01)

(58) Field of Classification Search
CPC .. G03B 21/16; G03B 21/145; G03B 21/2013; H04N 9/3141; H04N 9/3144; H04N 9/3164; F21V 29/02; F21V 29/20
See application file for complete search history.

(56) References Cited

U.S. PATENT DOCUMENTS 6,488,378 B1 * 12/2002 Tabuchi ................. G03B 21/16
353/52
2008/0094582 A1 * 4/2008 Nakagawa ............. G03B 21/16
353/61

FOREIGN PATENT DOCUMENTS

JP        2009-211000 A    9/2009
JP        2013-218101 A    10/2013

* cited by examiner

*Primary Examiner* — Sultan Chowdhury
(74) *Attorney, Agent, or Firm* — ALG Intellectual Property, LLC (57) ABSTRACT

An illumination device includes: a first light source device and a second light source device that emit light in directions opposite to each other in a first direction; a reflective portion that is disposed between the first light source device and the second light source device, and reflects the light emitted from the first light source device and the second light source device in a second direction crossing the first direction; and a cooling device that is disposed on one side of the reflective portion in a direction crossing the first direction and the second direction, and blows cooling air to the first light source device and the second light source device.

20 Claims, 8 Drawing Sheets

ILLUMINATION DEVICE AND PROJECTOR

BACKGROUND

1. Technical Field

The present invention relates to an illumination device and a projector.

2. Related Art

In the related art, a projector that modulates light emitted from a light source in response to image information and projects the modulated light onto a projection surface such as a screen has been known. Moreover, a device including a plurality of light sources for projecting a brighter image and configured to cool the light sources has been proposed (e.g., see JP-A-2013-218101).

The device (lamp unit) disclosed in JP-A-2013-218101 includes: a lamp fan base forming a housing structure; a lamp case including four lamp holders on which four light source lamps are respectively mounted, and movably supported to the lamp fan base; a fan base on which blast fans are placed and which is supported to the lamp fan base; and a duct provided in the fan base and guiding the air from the blast fan to a light-emitting portion of the light source lamp. Four blast fans are provided corresponding to the four lamp holders, and respectively disposed above the lamp holders.

However, since the lamp unit disclosed in JP-A-2013-218101 has a structure in which the four blast fans are respectively stacked on the lamp holders, the lamp unit has problems such as an increase in the size of the device or an increase in the thickness of the entire device.

SUMMARY

An advantage of some aspects of the invention is to solve at least a part of the problems described above, and the invention can be implemented as the following modes or application examples.

Application Example 1

An illumination device according to this application example includes: a first light source device and a second light source device that emit light in directions opposite to each other in a first direction; a reflective portion that is disposed between the first light source device and the second light source device, and reflects the light emitted from the first light source device and the second light source device in a second direction crossing the first direction; and a cooling device that is disposed on one side of the reflective portion in a third direction crossing the first direction and the second direction, and blows cooling air to the first light source device and the second light source device.

According to this configuration, the illumination device includes the plurality of light source devices, the reflective portion, and the cooling device disposed on one side of the reflective portion in the third direction. The one side of the reflective portion in the third direction does not serve as the optical path of the light from the light source device, and is a region that is liable to be a dead space, and therefore, the cooling device can be efficiently disposed. Accordingly, it is possible to provide the illumination device emitting light of high luminance and suppressing an increase in size and the degradation of the plurality of light source devices.

Application Example 2

In the illumination device according to the application example, it is preferable that the cooling device includes a first cooling fan that blows cooling air to the first light source device and a second cooling fan that blows cooling air to the second light source device, and that the first cooling fan and the second cooling fan are disposed along the second direction.

According to this configuration, the illumination device includes the first cooling fan and the second cooling fan disposed along the second direction. Due to this, it is possible to provide the illumination device capable of suppressing an increase in the size of the cooling device in the first direction and reliably cooling the first light source device and the second light source device.

Application Example 3

In the illumination device according to the application example, it is preferable that the first cooling fan and the second cooling fan are sirocco fans each of which discharges cooling air, taken in a direction along a central axis of rotation of blades, in a tangential direction of rotation, and include, on the side opposite to the reflective portion, suction ports through which cooling air is taken in, and that discharge ports through which the taken-in cooling air is discharged are each disposed facing the side of the first light source device in the first cooling fan and facing the side of the second light source device in the second cooling fan.

According to this configuration, the first cooling fan and the second cooling fan are composed of the sirocco fans, and include the suction ports on the side opposite to the reflective portion. The sirocco fan has a high discharge pressure of cooling air to be discharged, compared with an axial fan, and therefore can blow the cooling air intensively to a light source in the light source device. Accordingly, it is possible to provide the illumination device including the cooling device capable of efficiently taking in cooling air and efficiently cooling the light source devices.

Application Example 4

In the illumination device according to the application example, it is preferable that the first light source device and the second light source device are disposed with the optical axes thereof shifted in the third direction, and that the first cooling fan is disposed shifted relative to the second cooling fan in the same direction as a direction in which the first light source device is shifted relative to the second light source device.

According to this configuration, the first cooling fan and the second cooling fan are disposed corresponding to the positions of the first light source device and the second light source device, and therefore, a flow path from the first cooling fan to the first light source device and a flow path from the second cooling fan to the second light source device can be equivalent to each other in length or shape. Accordingly, the first light source device and the second light source device can be efficiently cooled equally.

Application Example 5

In the illumination device according to the application example, it is preferable that the first cooling fan and the second cooling fan are disposed such that portions thereof overlap each other.

According to this configuration, the first cooling fan and the second cooling fan disposed along the second direction are disposed such that portions of the cooling fans overlap each other. Therefore, it is possible to suppress an increase in the size of the cooling device in the second direction, which in turn makes it possible to suppress an increase in the size of the illumination device in the second direction. Moreover, compared with a configuration in which two cooling fans are disposed so as not to overlap each other, a fan having a large size in the plan view can be employed without increasing the size of the illumination device. Therefore, it is possible to increase the volume of cooling air to be blown and thus more efficiently cool the light source device.

Application Example 6

In the illumination device according to the application example, it is preferable that the first cooling fan and the second cooling fan are disposed such that a discharge direction in which cooling air is discharged is inclined to the first direction and that an angle of the discharge direction with respect to the first direction is smaller than an angle with respect to the second direction.

According to this configuration, the first cooling fan and the second cooling fan are the sirocco fans, and disposed as described above. Due to this, even when a portion of one of the cooling fans is disposed to overlap the other cooling fan, the suction port of the other cooling fan is not closed, and it is possible to blow cooling air toward the centers of the first light source device and the second light source device disposed to face each other. Accordingly, it is possible to efficiently cool the first light source device and the second light source device.

Moreover, it is possible to use, as the first cooling fan and the second cooling fan, cooling fans having capabilities equivalent to each other in the velocity or volume of cooling air to be discharged, and therefore, it is possible to equally cool the first light source device and the second light source device.

Application Example 7

In the illumination device according to the application example, it is preferable that the first cooling fan and the second cooling fan include ventilation portions through which the taken-in cooling air circulates along the tangential direction of rotation, and that the ventilation portions are disposed so as to be located between the central axes of rotation of the first cooling fan and the second cooling fan.

According to this configuration, the cooling air taken in from the first cooling fan and the second cooling fan is directed linearly from the ventilation portion to the discharge port, and discharged through the discharge port. Due to this, compared with a configuration in which the ventilation portions of the first cooling fan and the second cooling fan are disposed so as to be located outside a gap between the central axes of rotation thereof, the angle of the discharge direction of the cooling air with respect to the first direction can be made small. Accordingly, it is possible to suppress the loss of the volume or velocity of the cooling air discharged from each of the cooling fans and thus efficiently cool each of the light source devices.

Application Example 8

In the illumination device according to the application example, it is preferable that a plurality of sets of the first light source device and the second light source device are provided along the second direction.

According to this configuration, the illumination device includes four or more light source devices and the cooling device blowing cooling air to each of the light source devices. Therefore, it is possible to emit light of higher luminance and reliably cool each of the light source devices.

Application Example 9

In the illumination device according to the application example, it is preferable that two sets of the first light source device and the second light source device are provided along the second direction.

According to this configuration, the illumination device includes four light source devices and the cooling device blowing cooling air to each of the light source devices. Therefore, it is possible to emit light of higher luminance and reliably cool the four light source devices.

Application Example 10

In the illumination device according to the application example, it is preferable that the cooling device includes a plurality of the first cooling fans and a plurality of the second cooling fans, that the illumination device includes a rear stage-side holding body that holds one or two cooling fans of the plurality of the first cooling fans and the plurality of the second cooling fans, which are successively disposed from the rearmost-stage side of an optical path in the illumination device, and that the rear stage-side holding body is detachable in a state where the other cooling fans than the cooling fan held by the rear stage-side holding body are incorporated into the illumination device.

According to this configuration, the rear stage-side holding body is configured as described above in the illumination device. Therefore, in an apparatus in which the illumination device is mounted, the rear stage-side holding body can be detached together with the cooling fan held by the rear stage-side holding body. Due to this, a member or device (e.g., an optical member or the like that is irradiated with the light emitted from the illumination device) disposed in the vicinity of the rear stage-side holding body in the apparatus can be easily removed. Accordingly, it is possible to easily perform the repair or exchange of the member or device disposed in the vicinity of the rear stage-side holding body in the apparatus.

Application Example 11

A projector according to this application example includes: the illumination device described above; a light modulator that modulates light emitted from the illumination device; and a projection optical device that projects the light modulated by the light modulator.

According to this configuration, the projector include the illumination device described above, and therefore can project a bright image over a long period of time while suppressing an increase in size.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to an embodiment will be described with reference to the drawings.

The projector of the embodiment modulates light emitted from a light source in response to image information, and enlarges and projects the modulated light onto a projection surface such as a screen. Moreover, the projector of the embodiment is placed on a desk or the like, and configured to be able to assume a horizontally mounted attitude in which a landscape-oriented image is projected on the projection surface and a vertically mounted attitude in which the projector is rotated by 90° from the horizontally mounted attitude as viewed from the side facing the projection surface and a portrait-oriented image is projected on the projection surface.

Main Configuration of Projector

Figure 1:
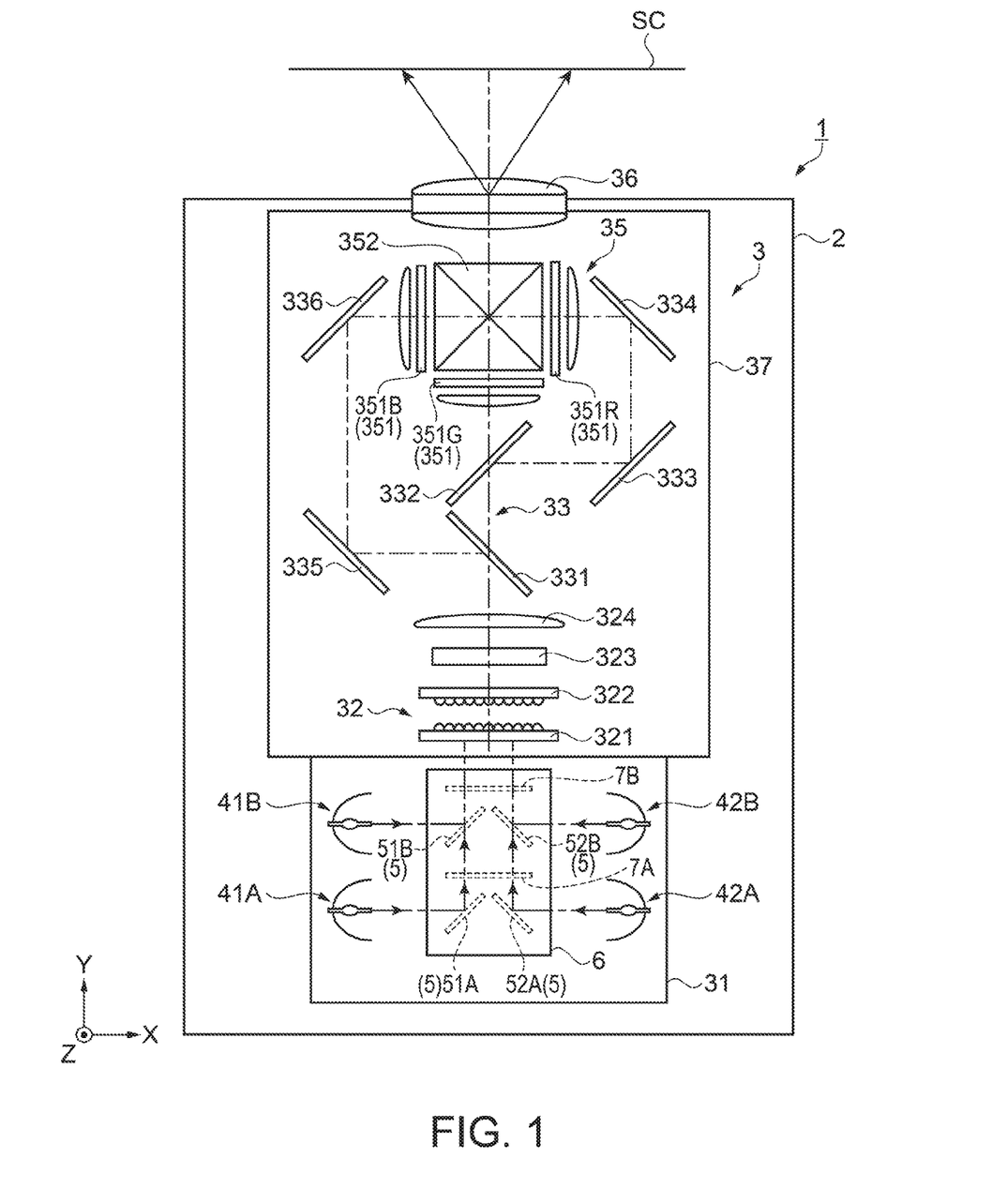
FIG. 1 is a schematic view showing a schematic configuration of a projector of an embodiment.

FIG. 1 is a schematic view showing a schematic configuration of the projector 1 of the embodiment.

As shown in FIG. 1, the projector 1 includes an external housing 2 constituting the exterior of the projector, a control unit (not shown), and an optical unit 3 including an illumination device 31. Although not shown in the drawing, a power source device that supplies power to the illumination device 31, the control unit, and the like, a suction fan and an exhaust fan for cooling the interior of the external housing 2, an air-guiding member, and the like are further disposed in the interior of the external housing 2. Moreover, in the following, in the projector 1 assuming the horizontally mounted attitude, the side of the projection surface SC is described as +Y-side (front side), the right side as viewed from the side facing the projection surface SC is described as +X-side, and the upper side in the vertical direction is described as +Z-side, for convenience of description.

Although a detailed description is omitted, the external housing 2 is composed of a plurality of members, and provided with a suction port through which outside air is taken in, an exhaust port through which warmed air in the interior of the external housing 2 is exhausted to the outside, and the like.

The control unit includes a circuit board on which circuit elements such as a CPU (Central Processing Unit), a ROM (Read Only Memory), and a RAM (Random Access Memory) are mounted, and functions as a computer. The control unit performs control for the operation of the projector 1, for example, control relating to the projection of an image, or control for the driving or the like of the various kinds of fans.

Configuration of Optical Unit

Under the control by the control unit, the optical unit 3 optically processes the light emitted from the illumination device 31 and projects the light.

As shown in FIG. 1, the optical unit 3 includes, in addition to the illumination device 31, an integrator illumination optical system 32, a color separation optical system 33, an optical device 35, a projection lens 36 as a projection optical device, and an optical component housing 37 in which these optical components 31 to 36 are disposed at predetermined positions on an optical path.

Although described in detail later, the illumination device 31 includes four light source devices (first light source devices 41A and 41B and second light source devices 42A and 42B), a reflective portion 5, and a cooling device 6.

The illumination device 31 reflects light emitted from the light source devices with the reflective portion 5, and emits the light toward the integrator illumination optical system 32.

The cooling device 6 includes four cooling fans described later, and cools the first light source devices 41A and 41B and the second light source devices 42A and 42B.

The integrator illumination optical system 32 includes a first lens array 321, a second lens array 322, a polarization conversion element 323, and a superimposing lens 324.

The first lens array 321 has a configuration including small lenses arranged in a matrix, and divides the light emitted from the illumination device 31 into a plurality of partial lights. The second lens array 322 has a configuration substantially similar to the first lens array 321, and substantially superimposes, together with the superimposing lens 324, the partial lights on the surface of a liquid crystal panel described later. The polarization conversion element 323 has a function of making random light emitted from the second lens array 322 into substantially one kind of polarized light that can be used on the liquid crystal panel.

The color separation optical system 33 includes two dichroic mirrors 331 and 332 and reflection mirrors 333 to 336, separates the light emitted from the integrator illumination optical system 32 into three colored lights, red light (hereinafter referred to as "R-light"), green light (hereinafter referred to as "G-light"), and blue light (hereinafter referred to as "B-light"), and guides the lights to the optical device 35.

The optical device 35 includes light modulators 351 provided for the respective colored lights (a light modulator for the R-light is 351R; a light modulator for the G-light is 351G; and a light modulator for the B-light is 351B), and a cross dichroic prism 352 as a color combining optical device.

Each of the light modulators 351 includes a transmissive liquid crystal panel, an incident-side polarizer disposed on the light-incident side of the liquid crystal panel, and an exiting-side polarizer disposed on the light-exiting side of the liquid crystal panel, and modulates the colored light in response to image information.

The cross dichroic prism 352 has a substantially square shape, in a plan view, with four right-angle prisms bonded together, and two dielectric multilayer films are formed at an interface where the right-angle prisms are bonded together. In the cross dichroic prism 352, the dielectric multilayer films reflect the R-light and B-light modulated by the light modulators 351R and 351B, and transmit the G-light modulated by the light modulator 351G, to combine the modulated lights of three colors.

The projection lens 36 is configured to include a plurality of lenses (not shown), and enlarges and projects the light combined by the cross dichroic prism 352 onto the projection surface SC.

Configuration of Illumination Device

Here, the illumination device 31 will be described in detail.

Figure 2:
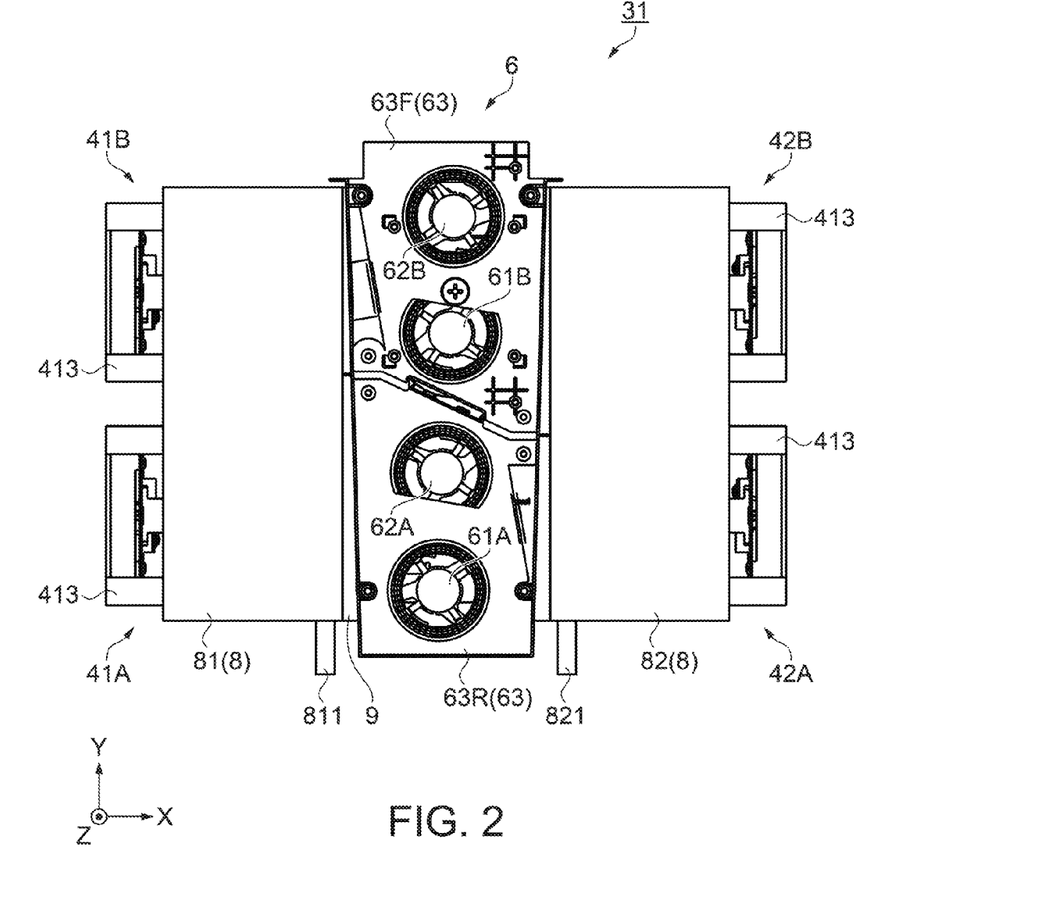
FIG. 2 is a plan view of an illumination device of the embodiment as viewed from above.
Figure 3:
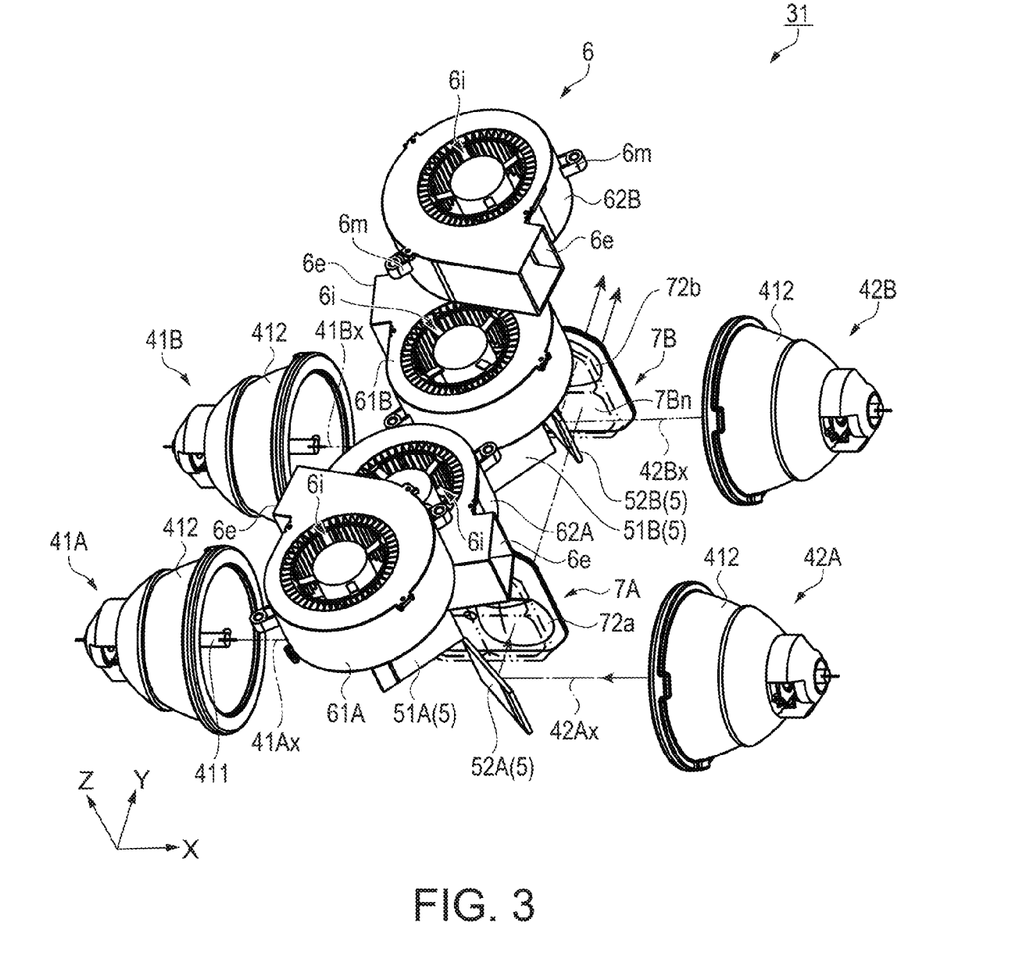
FIG. 3 is a perspective view showing a main configuration of the illumination device of the embodiment.
Figure 4A:
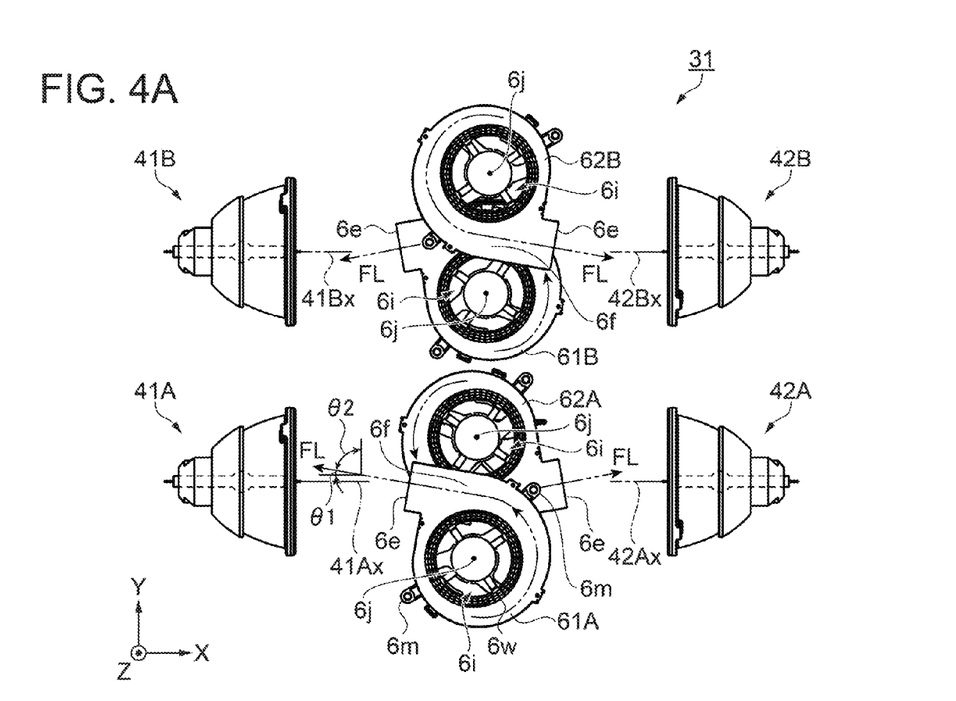
FIGS. 4A and 4B are plan views each showing a main configuration of the illumination device of the embodiment.
Figure 4B:
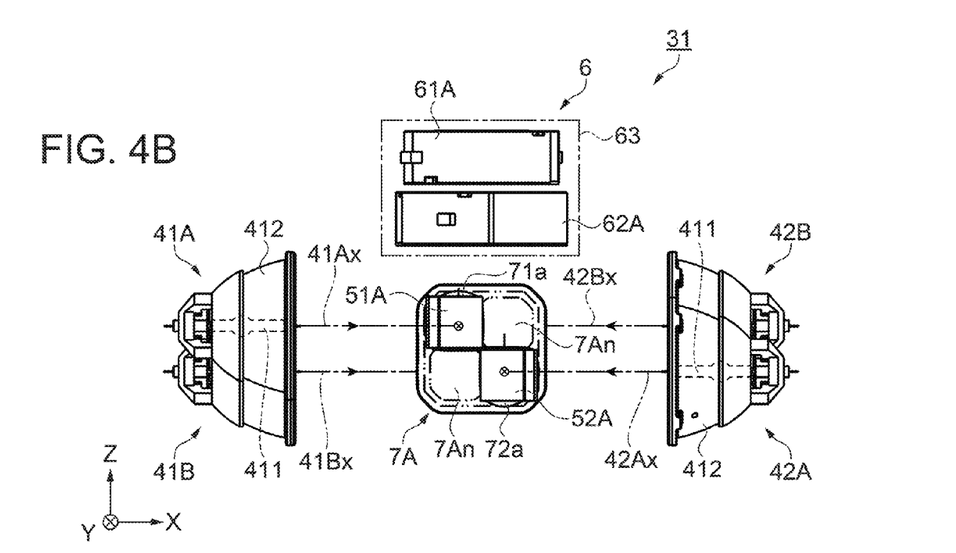

FIG. 2 is a plan view of the illumination device 31 as viewed from above, in which a later-described circuit board 64 (see FIG. 5) of the cooling device 6 is omitted. FIG. 3 is a perspective view showing a main configuration of the illumination device 31. FIGS. 4A and 4B are plan views each showing a main configuration of the illumination device 31, in which FIG. 4A is a diagram as viewed from above; and FIG. 4B is a diagram as viewed from the −Y-side.

As shown in FIGS. 2 to 4B, in addition to the first light source devices 41A and 41B, the second light source devices 42A and 42B, the reflective portion 5, and the cooling device 6, the illumination device 31 includes lens bodies 7A and 7B, a light source device holding portion 8, and a base portion 9 that slidably supports the light source device holding portion 8 and is fixed to the optical component housing 37.

The first light source devices 41A and 41B and the second light source devices 42A and 42B each include a discharge-type light source 411 composed of an extra-high-pressure mercury lamp, a metal halide lamp, or the like, a reflector 412, and a light-source housing 413, reflect light emitted from the light source 411 with the reflector 412, and emit the light with the emitting direction thereof aligned.

The first light source device 41A and the second light source device 42A are disposed so as to emit light in directions opposite to each other in the X-direction. The X-direction corresponds to a first direction. Specifically, the first light source device 41A emits light in the +X-direction, while the second light source device 42A emits light in the −X-direction.

The first light source device 41B and the second light source device 42B are disposed on the +Y-side of the first light source device 41A and the second light source device 42A, respectively, and emit light in directions opposite to each other in the X-direction similarly to the first light source device 41A and the second light source device 42A.

That is, the illumination device 31 includes two sets of the light source devices that emit light in directions opposite to each other, that is, the first light source device 41A and the second light source device 42A, and the first light source device 41B and the second light source device 42B. These two sets are disposed along the Y-direction crossing the X-direction (first direction). The +Y-direction corresponds to a second direction. Moreover, the first light source device 41A and the second light source device 42A are disposed such that, as viewed from above, an optical axis 41Ax and an optical axis 42Ax of lights emitted by the first light source device 41A and the second light source device 42A, respectively, coincide with each other. Similarly, the first light source device 41B and the second light source device 42B are disposed such that, as viewed from above, an optical axis 41Bx and an optical axis 42Bx thereof coincide with each other.

Moreover, as shown in FIG. 4B, the first light source device 41A and the second light source device 42A are disposed with the optical axes 41Ax and 42Ax thereof shifted in the Z-direction crossing the X-direction (first direction) and the +Y-direction (second direction). Similarly, the first light source device 41B and the second light source device 42B are disposed with the optical axes 41Bx and 42Bx thereof shifted in the Z-direction. The Z-direction corresponds to a third direction.

Specifically, the first light source device 41A and the second light source device 42A are disposed such that the optical axis 41Ax of the first light source device 41A is located above the optical axis 42Ax of the second light source device 42A, while the first light source device 41B and the second light source device 42B are disposed such that the optical axis 41Bx of the first light source device 41B is located below the optical axis 42Bx of the second light source device 42B. Moreover, in the Z-direction, the first light source device 41B is disposed at substantially the same position as the second light source device 42A, while the second light source device 42B is disposed at substantially the same position as the first light source device 41A.

As shown in FIG. 2, the light source device holding portion 8 includes a first frame body 81 that holds the first light source devices 41A and 41B and a second frame body 82 that holds the second light source devices 42A and 42B.

The first frame body 81 is formed with the +X-side and −X-side thereof opened, and the first light source devices 41A and 41B are held in the interior of the first frame body 81. The second frame body 82 is formed with the +X-side and −X-side thereof opened similarly to the first frame body 81, and the second light source devices 42A and 42B are held in the interior of the second frame body 82. Moreover, gripping portions 811 and 821 that project in the −Y-direction are formed on wall portions on the −Y-side in the first frame body 81 and the second frame body 82, respectively.

The first frame body 81 is configured to be slidable in the Y-direction. The first light source devices 41A and 41B are detached by a user gripping the gripping portion 811 in a state where the first light source devices 41A and 41B are held in the first frame body 81. Similarly to the first frame body 81, the second frame body 82 is configured to be slidable in the Y-direction. The second light source devices 42A and 42B are detached by the user gripping the gripping portion 821 in a state where the second light source devices 42A and 42B are held in the second frame body 82.

As shown in FIG. 3, the reflective portion 5 includes first reflection mirrors 51A and 51B, second reflection mirrors 52A and 52B, and a holding member (not shown) that holds these members.

As shown in FIGS. 3 and 4B, the first reflection mirror 51A and the second reflection mirror 52A are disposed between the first light source device 41A and the second light source device 42A. Moreover, the first reflection mirror 51A and the second reflection mirror 52A are disposed such that the first reflection mirror 51A is located above the second reflection mirror 52A corresponding to the positions of the first light source device 41A and the second light source device 42A. The first reflection mirror 51A and the second reflection mirror 52A respectively reflect lights emitted from the first light source device 41A and the second light source device 42A in the +Y-direction (second direction) crossing the X-direction (first direction).

As shown in FIG. 3, the first reflection mirror 51B and the second reflection mirror 52B are disposed between the first light source device 41B and the second light source device 42B. Moreover, the first reflection mirror 51B and the second reflection mirror 52B are disposed such that the first reflection mirror 51B is located below the second reflection mirror 52B corresponding to the positions of the first light source device 41B and the second light source device 42B. The first reflection mirror 51B and the second reflection mirror 52B respectively reflect lights emitted from the first light source device 41B and the second light source device 42B in the +Y-direction (second direction).

The lens bodies 7A and 7B have a function of aligning the traveling directions of the lights reflected by the reflective portion 5.

As shown in FIGS. 3 and 4B, the lens body 7A has a shape obtained by cutting four corners from a rectangular shape in the plan view. In four vertically and horizontally divided regions, a first lens portion 71a is provided in the upper left region, and a second lens portion 72a is provided in the lower right region. Moreover, the first lens portion 71a is formed at a position on which the light reflected by the first reflection mirror 51A is incident, while the second lens portion 72a is formed at a position on which the light reflected by the second reflection mirror 52A is incident. In the four vertically and horizontally divided regions, the lens body 7A includes non-lens portions 7An in the lower left region and the upper right region.

Similarly to the lens body 7A, the lens body 7B has a shape obtained by cutting four corners from a rectangular shape in the plan view. In four vertically and horizontally divided regions, a first lens portion 71b (not shown) is provided in the lower left region, and a second lens portion 72b (see FIG. 3) is provided in the upper right region. Moreover, the first lens portion 71b is formed at a position on which the light reflected by the first reflection mirror 51B is incident, while the second lens portion 72b is formed at a position on which the light reflected by the second reflection mirror 52B is incident. In the four vertically and horizontally divided regions, the lens body 7B includes non-lens portions 7Bn in the upper left region and the lower right region.

The light emitted from the first light source device 41A is reflected by the first reflection mirror 51A, and then passes through the first lens portion 71a and the non-lens portion 7Bn of the lens body 7B to be incident on an upper left-side region of the first lens array 321 in the plan view. The light emitted from the second light source device 42A is reflected by the second reflection mirror 52A, and then passes through the second lens portion 72a and the non-lens portion 7Bn of the lens body 7B to be incident on a lower right-side region of the first lens array 321 in the plan view.

The light emitted from the first light source device 41B is reflected by the first reflection mirror 51B, and then passes through the first lens portion 71b to be incident on a lower left-side region of the first lens array 321 in the plan view. The light emitted from the second light source device 42B is reflected by the second reflection mirror 52B, and then passes through the second lens portion 72b to be incident on an upper right-side region of the first lens array 321 in the plan view.

In this manner, the lights emitted from the first light source devices 41A and 41B and the second light source devices 42A and 42B are respectively incident on the four regions as if divided vertically and horizontally in the first lens array 321 in the plan view.

Figure 5:
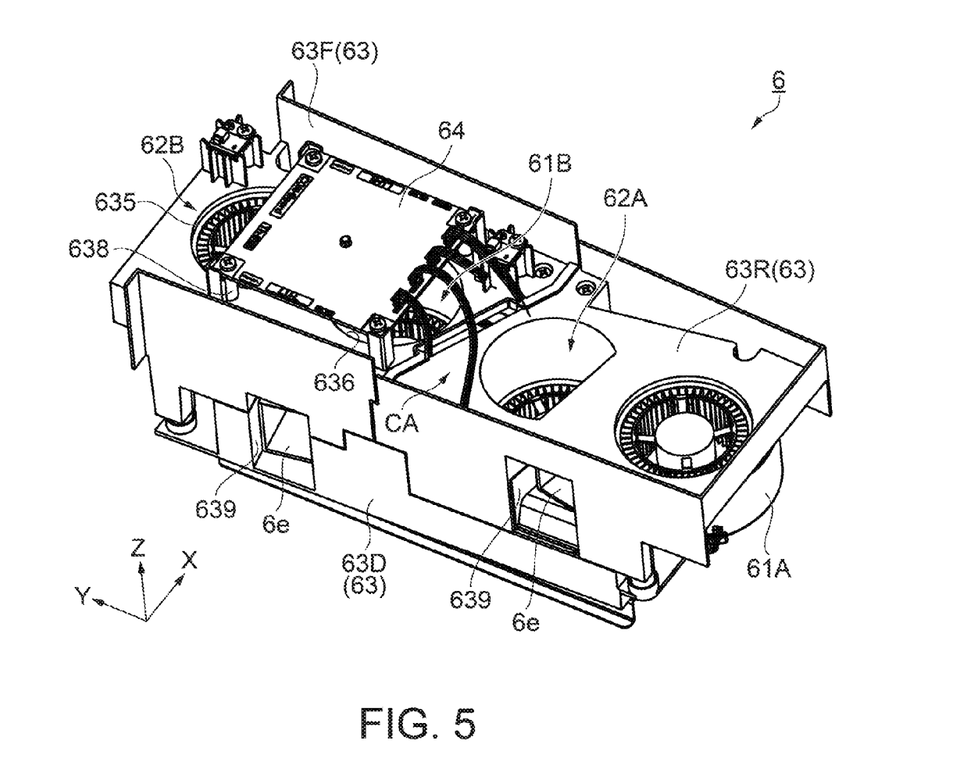
FIG. 5 is a perspective view of a cooling device of the embodiment.

FIG. 5 is a perspective view of the cooling device 6.

Figure 8:
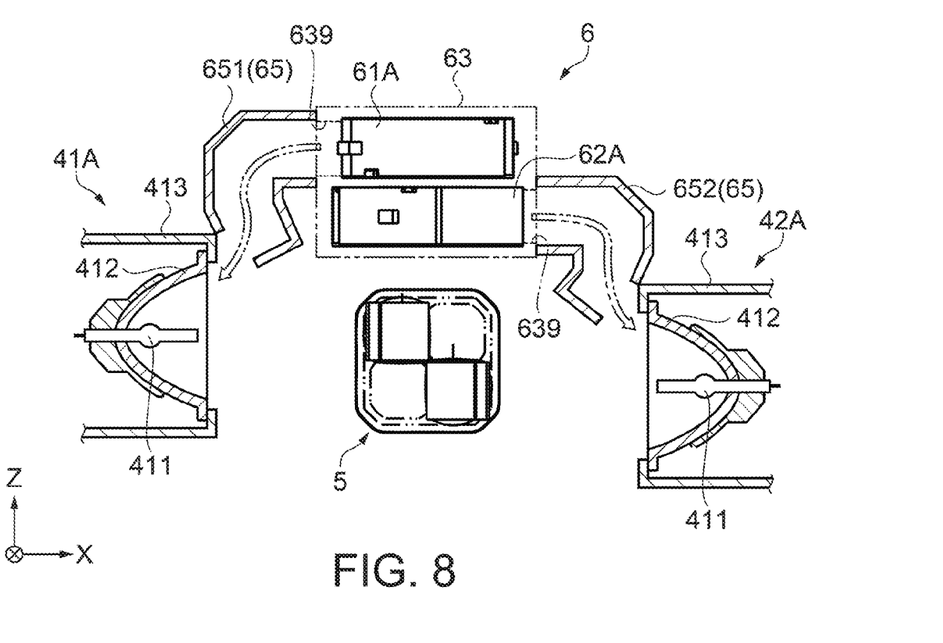
FIG. 8 is a schematic view for explaining duct members of the embodiment.

As shown in FIGS. 2 and 5, the cooling device 6 includes first cooling fans 61A and 61B, second cooling fans 62A and 62B, a holding portion 63, the circuit board 64, and a duct portion 65 (see FIG. 8). The cooling device 6 is disposed on one side of the reflective portion 5 in the Z-direction (third direction, vertical direction), and, in the embodiment, disposed on the upper side of the reflective portion 5.

As shown in FIGS. 4A and 4B, the first cooling fans 61A and 61B and the second cooling fans 62A and 62B are provided corresponding to the first light source devices 41A and 41B and the second light source devices 42A and 42B, respectively. Specifically, the first cooling fan 61A blows cooling air to the first light source device 41A, and the first cooling fan 61B blows cooling air to the first light source device 41B. The second cooling fan 62A blows cooling air to the second light source device 42A, and the second cooling fan 62B blows cooling air to the second light source device 42B.

The first cooling fans 61A and 61B and the second cooling fans 62A and 62B are sirocco fans each of which discharges cooling air, taken in in the direction along a central axis 6j of rotation of blades 6w, in the tangential direction of rotation. As shown in FIG. 4A, the first cooling fans 61A and 61B and the second cooling fans 62A and 62B each include a suction port 6i that is provided on a cylindrical one side (+Z-side) and through which cooling air is taken in, a ventilation portion 6f through which the taken-in cooling air circulates along the tangential direction of rotation, a discharge port 6e through which the cooling air circulating through the ventilation portion 6f is discharged, and attaching projection portions 6m. Moreover, common sirocco fans are used for the first cooling fans 61A and 61B and the second cooling fans 62A and 62B.

As shown in FIGS. 3, 4A, and 4B, the first cooling fans 61A and 61B and the second cooling fans 62A and 62B are disposed along the +Y-direction (second direction) with the suction ports 6i opened on the side (+Z-side) opposite to the reflective portion 5 and with the discharge ports 6e respectively facing the sides of the light source devices to be cooled. Specifically, the four cooling fans are disposed successively from the −Y-side in order of the first cooling fan 61A, the second cooling fan 62A, the first cooling fan 61B, and the second cooling fan 62B. That is, the first cooling fans 61A and 61B and the second cooling fans 62A and 62B are alternately disposed along the second direction. The first cooling fans 61A and 61B are disposed with the respective discharge ports 6e facing the sides of the first light source devices 41A and 41B, and the second cooling fans 62A and 62B are disposed with the respective discharge ports 6e facing the sides of the second light source devices 42A and 42B.

Moreover, as shown in FIG. 4A, the first cooling fan 61A and the second cooling fan 62A are disposed such that portions thereof overlap each other; the first cooling fan 61B and the second cooling fan 62B are disposed such that portions thereof overlap each other; and the second cooling fan 62A and the first cooling fan 61B are disposed separately from each other in the Y-direction. That is, the cooling fans that respectively blow cooling air to the light source devices disposed to face each other are disposed such that portions of the cooling fans overlap each other.

Specifically, the first cooling fan 61A is disposed such that the first cooling fan 61A is shifted relative to the second cooling fan 62A in the same direction as the direction in which the first light source device 41A is shifted relative to the second light source device 42A, and that a +Y-side edge portion of the first cooling fan 61A overlaps a −Y-side edge portion of the second cooling fan 62A. That is, the first cooling fan 61A is located above the second cooling fan 62A, and disposed so as to overlap the outer side of the suction port 6i of the second cooling fan 62A.

The first cooling fan 61B is disposed such that the first cooling fan 61B is shifted relative to the second cooling fan 62B in the same direction as the direction in which the first light source device 41B is shifted relative to the second light source device 42B, and that a −Y-side edge portion of the second cooling fan 62B overlaps a +Y-side edge portion of the first cooling fan 61B. That is, the first cooling fan 61B is located below the second cooling fan 62B, and the second cooling fan 62B is disposed so as to overlap the outer side of the suction port 6i of the first cooling fan 61B.

Moreover, in the Z-direction, the first cooling fan 61A and the second cooling fan 62B are disposed at substantially the same position, and the first cooling fan 61B and the second cooling fan 62A are disposed at substantially the same position.

Figure 6:
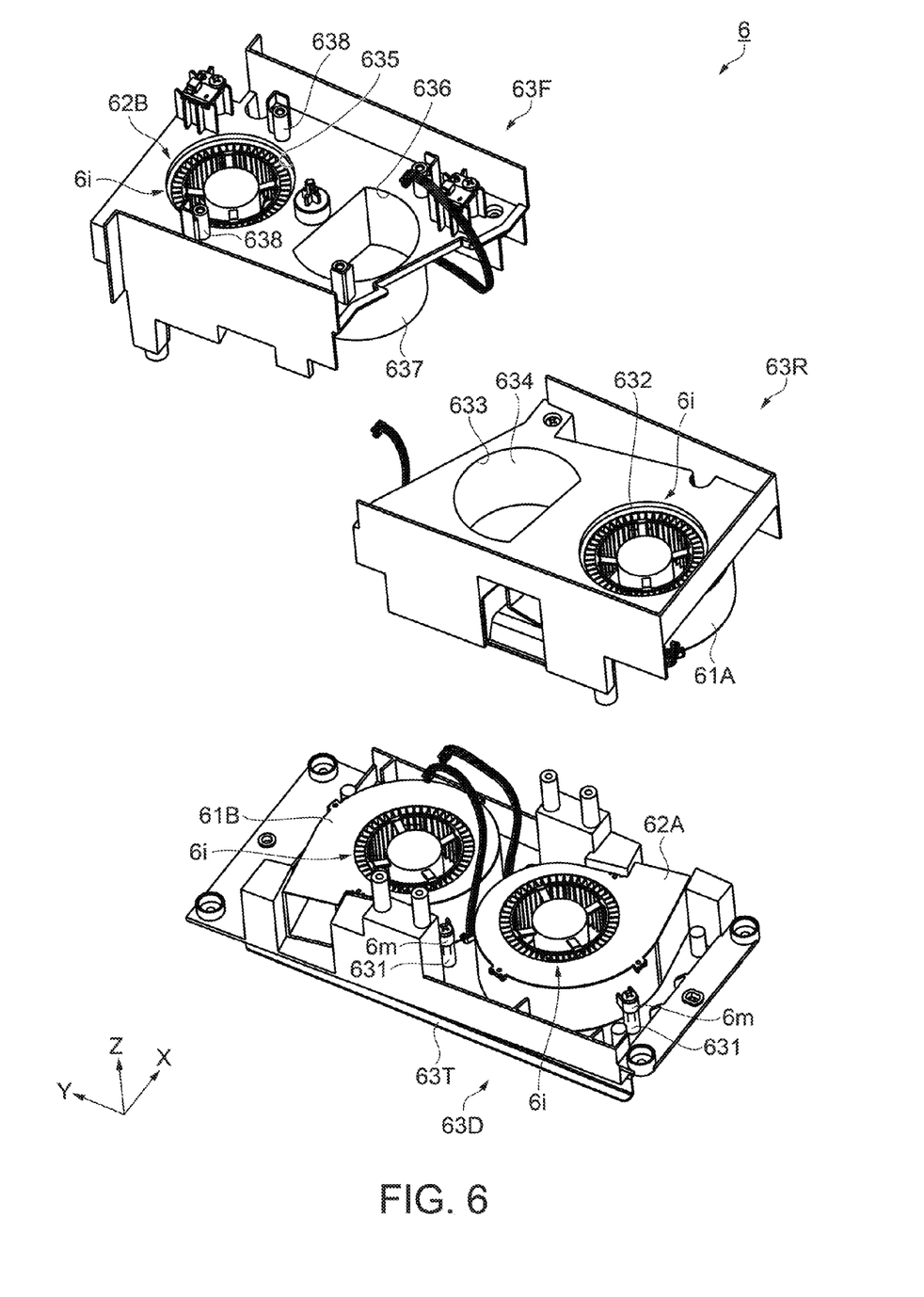
FIG. 6 is an exploded perspective view of the cooling device of the embodiment.
Figure 7:
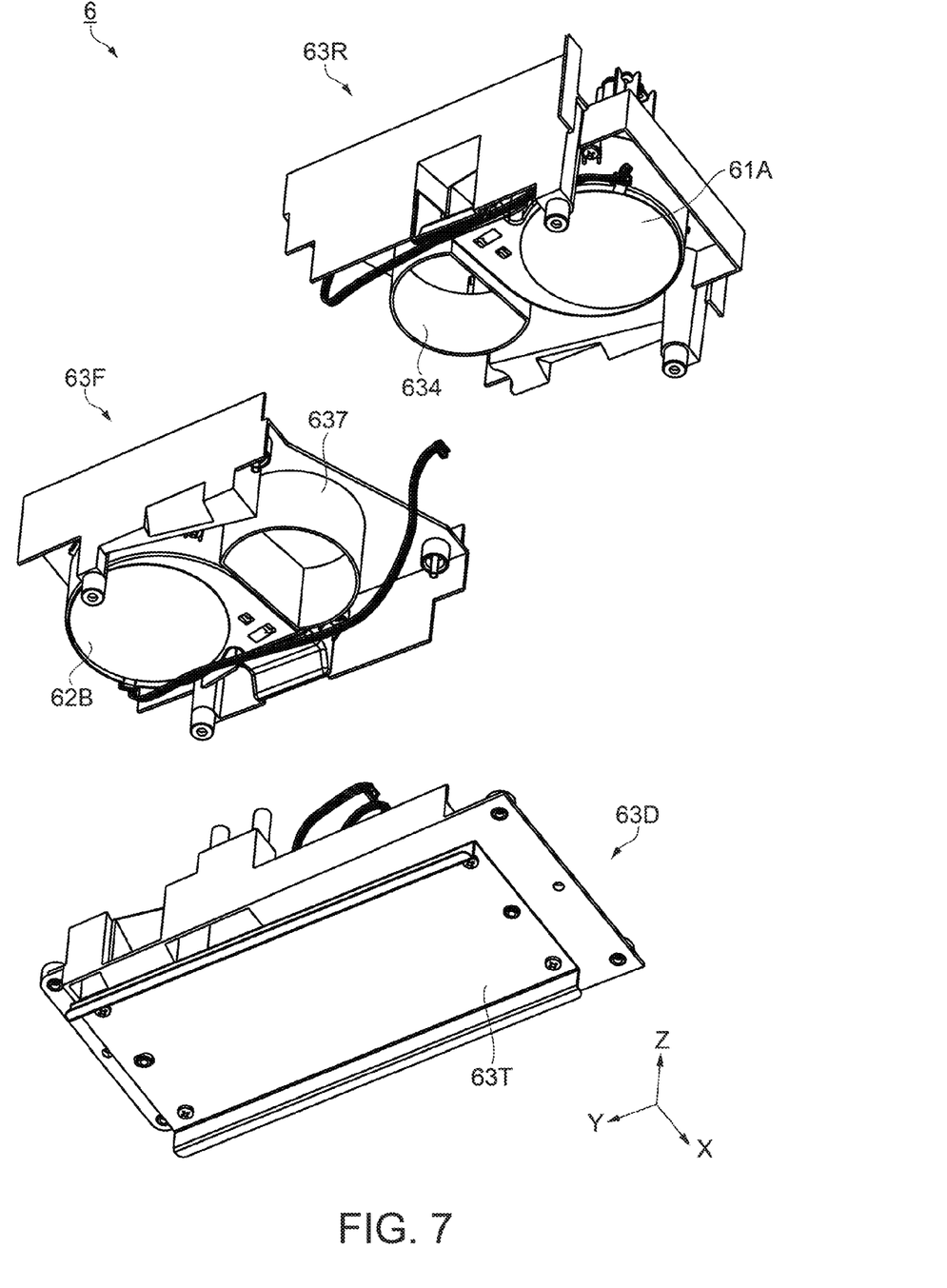
FIG. 7 is an exploded perspective view of the cooling device of the embodiment.

FIG. 6 is an exploded perspective view of the cooling device 6 as viewed from obliquely above. FIG. 7 is an exploded perspective view of the cooling device 6 as viewed from obliquely below.

As shown in FIGS. 5 to 7, the holding portion 63 includes a lower-side holding body 63D, a front stage-side holding body 63R, a rear stage-side holding body 63F, and a light-shielding plate 63T. The lower-side holding body 63D, the front stage-side holding body 63R, and the rear stage-side holding body 63F are combined together to thereby form a box-shape, and formed so as to hold the first cooling fans 61A and 61B and the second cooling fans 62A and 62B therein.

The lower-side holding body 63D forms the lower side of the holding portion 63, and holds the second cooling fan 62A and the first cooling fan 61B of the first cooling fans 61A and 61B and the second cooling fans 62A and 62B, which are located on the lower side, as shown in FIG. 6. Specifically, the lower-side holding body 63D is formed in a rectangular shape in the plan view in which the lower-side holding body 63D is longer in the Y-direction than in the X-direction, and cylindrical projections 631 are provided at positions corresponding to the attaching projection portions 6m of the second cooling fan 62A and the first cooling fan 61B. A screw hole is provided in the projection 631. Screws are inserted through holes formed in the attaching projection portions 6m, and the screws are screw-tightened to the projections 631, so that the second cooling fan 62A and the first cooling fan 61B are fixed to the upper side of the lower-side holding body 63D.

The front stage-side holding body 63R forms the −Y-side of the holding portion 63 on the upper side, that is, the front-stage side of the optical path in the illumination device 31. The front stage-side holding body 63R includes a projection (not shown) similar to the projection 631 of the lower-side holding body 63D, and the first cooling fan 61A is screw-fastened to the lower side of the front stage-side holding body 63R. Moreover, an opening 632 that opens the suction port 6i of the first cooling fan 61A and an opening 633 that corresponds to the suction port 6i of the second cooling fan 62A are formed in the front stage-side holding body 63R. A tubular portion 634 that projects toward the peripheral edge portion of the suction port 6i of the second cooling fan 62A is formed at the peripheral edge portion of the opening 633.

The rear stage-side holding body 63F forms the +Y-side of the holding portion 63 on the upper side, that is, the rear-stage side of the optical path in the illumination device 31. The rear stage-side holding body 63F includes a projection (not shown) similar to the projection 631 of the lower-side holding body 63D, and the second cooling fan 62B is screw-fastened to the lower side of the rear stage-side holding body 63F. That is, the rear stage-side holding body 63F holds one cooling fan (the second cooling fan 62B) of the first cooling fans 61A and 61B and the second cooling fans 62A and 62B, which is disposed on the rearmost-stage side of the optical path in the illumination device 31.

Moreover, an opening 635 that opens the suction port 6i of the second cooling fan 62B and an opening 636 that corresponds to the suction port 6i of the first cooling fan 61B are formed in the rear stage-side holding body 63F. A tubular portion 637 that projects toward the peripheral edge portion of the suction port 6i of the first cooling fan 61B is provided at the peripheral edge portion of the opening 636.

The front stage-side holding body 63R to which the first cooling fan 61A is attached and the rear stage-side holding body 63F to which the second cooling fan 62B is attached are screw-fastened in this order to the lower-side holding body 63D to which the second cooling fan 62A and the first cooling fan 61B are attached. That is, the rear stage-side holding body 63F to which the second cooling fan 62B is attached is configured to be detachable in a state where the other cooling fans (the first cooling fans 61A and 61B and the second cooling fan 62A) are incorporated into the illumination device 31.

Moreover, as shown in FIG. 6, a plurality of cylindrical projections 638 each of which extends in the +Z-direction and includes a screw hole are formed on the upper surface of the rear stage-side holding body 63F.

Moreover, as shown in FIG. 5, openings 639 that open the discharge ports 6e of the cooling fans are formed in the side surfaces on the +X-side and the −X-side (the opening 639 on the +X-side is not shown) in the lower-side holding body 63D, the front stage-side holding body 63R, and the rear stage-side holding body 63F in the combined state.

The light-shielding plate 63T is formed of metal, and screw-fastened to the lower side of the lower-side holding body 63D as shown in FIG. 7. The light-shielding plate 63T blocks light from below the cooling device 6, that is, light reflected by the reflective portion 5 and then toward the cooling device 6, and has a function of preventing the degradation of the lower-side holding body 63D, the front stage-side holding body 63R, and the rear stage-side holding body 63F, or the first cooling fans 61A and 61B and the second cooling fans 62A and 62B.

The circuit board 64 has a function of relaying an electrical connection between the first cooling fans 61A and 61B and the second cooling fans 62A and 62B, and the control unit.

As shown in FIG. 5, the circuit board 64 is formed in a rectangular shape in the plan view, and screw-fastened to the projections 638 of the rear stage-side holding body 63F. Cables CA of the first cooling fans 61A and 61B and the second cooling fans 62A and 62B are connected to the circuit board 64, and a not-shown cable is connected from the circuit board 64 to a circuit board of the control unit. Although the circuit board 64 is located above the openings 635 and 636, the circuit board 64 is disposed sufficiently separated from the openings 635 and 636 so as not to hinder the capability of the first cooling fan 61B and the second cooling fan 62B to take in cooling air.

The duct portion 65 includes four duct members each disposed between the four cooling fans (the first cooling fans 61A and 61B and the second cooling fans 62A and 62B) and the four light source devices (the first light source devices 41A and 41B and the second light source devices 42A and 42B), and guides the cooling air discharged from the cooling fans to the light source devices.

FIG. 8 is a schematic view for explaining the duct members. Specifically, FIG. 8 is a cross-sectional view showing the vicinities of two of the four duct members, that is, a duct member 651 disposed between the first cooling fan 61A and the first light source device 41A and a duct member 652 disposed between the second cooling fan 62A and the second light source device 42A.

As shown in FIG. 8, the duct member 651 is formed so as to guide cooling air, discharged from the first cooling fan 61A and traveling through the opening 639 of the holding portion 63 in the −X-direction, to the −Z-direction and then exhaust the cooling air toward above the light source 411 in the reflector 412. As shown in FIG. 8, the duct member 652 is formed so as to guide cooling air, discharged from the second cooling fan 62A and traveling through the opening 639 of the holding portion 63 in the +X-direction, to the −Z-direction and then exhaust the cooling air toward above the light source 411 in the reflector 412.

Although not shown in the drawing, the duct member disposed between the first cooling fan 61B and the first light source device 41B is formed so as to guide cooling air similarly to the duct member 651 while the duct member disposed between the second cooling fan 62B and the second light source device 42B is formed so as to guide cooling air similarly to the duct member 652.

Then, the air that cooled the light source 411 of each of the light source devices and thus warmed is exhausted to the outside of the illumination device 31 through air holes (not shown) respectively formed in the reflector 412 and the light-source housing 413, and then exhausted by a not-shown exhaust fan to the outside of the external housing 2.

Here, the disposition attitude of the first cooling fans 61A and 61B and the second cooling fans 62A and 62B will be described in further detail.

Returning to FIG. 4A, in the first cooling fans 61A and 61B and the second cooling fans 62A and 62B, the blades 6w rotate counterclockwise as viewed from the side of the suction port 6i. The cooling fans that respectively blow cooling air to the light source devices disposed to face each other are disposed such that the ventilation portions 6f are located between the central axes 6j of rotation of the cooling fans. Specifically, the first cooling fan 61A and the second cooling fan 62A are disposed such that the ventilation portions 6f are located between the central axes 6j of rotation of the cooling fans, while the first cooling fan 61B and the second cooling fan 62B are disposed such that the ventilation portions 6f are located between the central axes 6j of rotation of the cooling fans. In other words, the first cooling fan 61A and the second cooling fan 62A are disposed such that the cooling air that is taken in by one of the cooling fans is directed linearly from the side of the other cooling fan to the discharge port 6e. Similarly, the first cooling fan 61B and the second cooling fan 62B are disposed such that the cooling air that is taken in by one of the cooling fans is directed linearly from the side of the other cooling fan to the discharge port 6e.

The first cooling fans 61A and 61B and the second cooling fans 62A and 62B are disposed with a discharge direction FL, in which cooling air is discharged, being inclined to the X-direction (first direction). Moreover, an angle θ1 of the discharge direction FL with respect to the X-direction (first direction) is smaller than an angle θ2 with respect to the +Y-direction (second direction).

The cooling fans are disposed as described above. Therefore, the suction port 6i of the overlapped cooling fan is not closed; the angle θ1 of the discharge direction FL with respect to the X-direction is made small; and thus it is possible to cause the cooling air discharged from the cooling fan to flow into each of the light source devices.

As has been described above, according to the embodiment, the following advantageous effects can be obtained.

(1) The illumination device 31 includes the plurality of light source devices (the first light source devices 41A and 41B and the second light source devices 42A and 42B) and the cooling device 6 disposed on one side (upper side) of the reflective portion 5 in the third direction (vertical direction, Z-direction). The peripheral portion of the reflective portion 5 in the third direction does not serve as the optical path of light from the light source device, and is a region that is liable to be a dead space. Therefore, the cooling device 6 can be efficiently disposed, which in turn makes it possible to suppress an increase in the size of the cooling device 6 in the third direction. Accordingly, it is possible to provide the illumination device 31 emitting light of high luminance and suppressing an increase in size and the degradation of the plurality of light source devices.

Moreover, the projector 1 includes the illumination device 31, and therefore can project a bright image over a long period of time while suppressing an increase in size.

(2) The illumination device 31 includes the plurality of cooling fans (the first cooling fans 61A and 61B and the second cooling fans 62A and 62B) disposed on a substantially straight line along the second direction (+Y-direction) and corresponding to the plurality of light source devices. Due to this, an increase in the size of the cooling device 6 in the first direction (X-direction) can be suppressed.

Moreover, the outside air that is supplied through the suction port (not shown) provided in the external housing 2 can be efficiently guided to the plurality of cooling fans, so that it is possible to provide the illumination device 31 capable of reliably cooling the plurality of light source devices.

(3) The plurality of cooling fans are composed of sirocco fans, and disposed with the suction ports 6i facing the side opposite to the reflective portion 5. The sirocco fan has a high discharge pressure of cooling air to be discharged, compared with an axial fan, and therefore can blow the cooling air intensively to the light source 411 of each the light source devices. Accordingly, it is possible to provide the illumination device 31 including the cooling device 6 capable of efficiently taking in cooling air and efficiently cooling each of the light source devices.

(4) Each of the cooling fans is disposed corresponding to the position of the light source device to be cooled, and therefore, flow paths from the cooling fans to the respective light source devices can be equivalent to each other in length or shape. Accordingly, the light source devices can be efficiently cooled equally.

(5) The cooling fans that respectively blow cooling air to the light source devices disposed to face each other are disposed such that portions of the cooling fans overlap each other. Due to this, it is possible to suppress an increase in the size of the cooling device 6 in the second direction (+Y-direction), which in turn makes it possible to suppress an increase in the size of the illumination device 31 in the second direction. Moreover, compared with a configuration in which cooling fans are disposed so as not to overlap each other, a fan having a large size in the plan view can be employed without increasing the size of the illumination device 31. Therefore, it is possible to increase the volume of cooling air to be blown and thus more efficiently cool the light source devices.

(6) Each of the cooling fans is disposed such that the discharge direction FL in which cooling air is discharged is inclined to the first direction, and that the angle θ1 with respect to the first direction is smaller than the angle θ2 with respect to the second direction. Due to this, in the two cooling fans that overlap each other (the first cooling fan 61A and the second cooling fan 62A, and the first cooling fan 61B and the second cooling fan 62B), the suction port 6i is not closed, and it is possible to blow cooling air toward the center of the light source device to be cooled. Accordingly, it is possible to efficiently cool each of the light source devices.

Moreover, it is possible to use, as the cooling fans, cooling fans having capabilities equivalent to each other in the velocity or volume of cooling air to be discharged, and therefore, it is possible to equally cool the light source devices.

(7) The cooling fans are configured such that, in the two cooling fans that overlap each other, the ventilation portions 6f are disposed so as to be located between the central axes 6j of rotation of the cooling fans, and that the angle θ1 of the discharge direction is small. Due to this, it is possible to suppress the loss of the volume or velocity of the cooling air discharged from each of the cooling fans and thus efficiently cool the light source 411 in each of the light source devices.

(8) The illumination device 31 includes the two sets of the first light source device 41A, 41B and the second light source device 42A, 42B emitting light in the first directions opposite to each other, and the cooling device 6 blowing cooling air to the light source devices. Therefore, it is possible to emit light of higher luminance and reliably cool the four light source devices.

(9) The cooling device includes the rear stage-side holding body 63F holding the second cooling fan 62B of the first cooling fans 61A and 61B and the second cooling fans 62A and 62B, which is disposed on the rearmost-stage side of the optical path in the illumination device 31, and the rear stage-side holding body 63F is configured to be detachable in the state where the other cooling fans (the first cooling fans 61A and 61B and the second cooling fan 62A) are incorporated into the illumination device 31. Due to this, it is possible to easily remove a member or device disposed in the vicinity of the rear stage-side holding body 63F in the projector 1. Accordingly, it is possible to easily perform the repair or exchange of the member or device disposed in the vicinity of the rear stage-side holding body 63F. Examples of the device disposed in the vicinity of the rear stage-side holding body 63F include, for example, a dimming device that adjusts the passing amount of the light emitted from the illumination device 31 although a description is omitted in the embodiment. Moreover, the member or device disposed in the vicinity of the rear stage-side holding body 63F is not limited to the dimming device, and may be an optical element or the like that is irradiated with the light emitted from the illumination device 31.

Modified Example

The embodiment may be modified as follows.

The illumination device of the embodiment includes the two sets of the first light source device 41A, 41B and the second light source device 42A, 42B emitting light in the first directions opposite to each other. However, the illumination device is not limited to that including two sets but may be an illumination device including one set or three or more sets of the first light source device and the second light source device disposed along the second direction.

Moreover, the illumination device may have a configuration including three or more odd number of light source devices as long as the illumination device includes at least one set of the first light source device and the second light source device that emit light in opposite directions.

The illumination device 31 of the embodiment is configured such that the lights emitted by the two sets of the first light source device 41A, 41B and the second light source device 42A, 42B are respectively incident on the four regions as if divided vertically and horizontally in the first lens array 321 in the plan view. However, for example, in the configuration including one set of the first light source device and the second light source device, the illumination device may be configured such that the lights emitted by the light source devices are incident on the entire surface of the first lens array 321.

The cooling device 6 of the embodiment includes the four cooling fans (the first cooling fans 61A and 61B and the second cooling fans 62A and 62B) individually corresponding to the four light source devices (the first light source devices 41A and 41B and the second light source devices 42A and 42B). However, the cooling device may be configured such that the number of light source devices and the number of cooling fans are different.

The first cooling fans 61A and 61B and the second cooling fans 62A and 62B of the embodiment include the suction port 6i provided on the cylindrical one side (+Z-side) and taking in cooling air, but the suction port 6i is not limited to this. The suction port 6i may be provided on the −Z-side. In other words, the first cooling fans 61A and 61B and the second cooling fans 62A and 62B may be sirocco fans each of which includes the suction port 6i on both the +Z-side and the −Z-side and takes in the air on both sides.

Moreover, the lower-side holding body 63D, the front stage-side holding body 63R, the rear stage-side holding body 63F, and the light-shielding plate 63T, which constitute the holding portion 63, may be provided with an opening for introducing cooling air at the position corresponding to the suction port 6i provided on the −Z-side.

In the illumination device 31 of the embodiment, the cooling device 6 is disposed above the reflective portion 5. However, the illumination device may be configured such that the cooling device 6 is disposed below the reflective portion 5.

Moreover, it is also possible to employ a configuration in which the plurality of cooling fans included in the cooling device 6 are disposed separately above and below the reflective portion 5.

Figure 9:
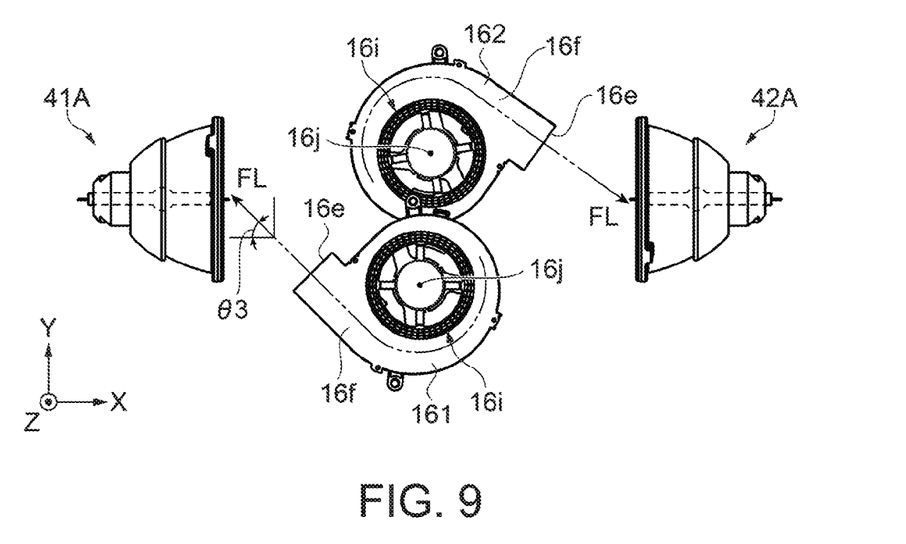
FIG. 9 is a diagram showing a modified example.

FIG. 9 is a diagram showing a modified example in the case of using a sirocco fan in which the suction port 6i is provided on the side opposite to that of the sirocco fan used in the embodiment, which is a plan view showing the first light source device 41A, the second light source device 42A, and a first cooling fan 161 and a second cooling fan 162 corresponding to the first light source device 41A and the second light source device 42A, respectively.

As shown in FIG. 9, the first cooling fan 161 and the second cooling fan 162 are disposed such that, as viewed from the side of a suction port 16i, the blades 6w rotate clockwise, and that ventilation portions 16f are located outside a gap between the central axes 16j of rotation of the cooling fans. The first cooling fan 161 and the second cooling fan 162 circulate taken-in cooling air to the side opposite to the gap between the central axes 16j of rotation of the cooling fans, and discharge the cooling air through discharge ports 16e.

An angle θ3 of the discharge direction FL of the cooling air discharged from the first cooling fan 161 and the second cooling fan 162 with respect to the X-direction (first direction) is larger than the angle θ1 (see FIG. 4A) of the embodiment, but the modified example can be applied to a mode in which cooling air is caused to flow further diagonally into the light source device.

The rear stage-side holding body 63F of the embodiment is configured so as to hold one cooling fan (the second cooling fan 62B) of the four cooling fans (the first cooling fans 61A and 61B and the second cooling fans 62A and 62B), which is disposed on the rearmost-stage side of the optical path. However, the rear stage-side holding body is not limited to this configuration. That is, a mode may be employed, in which the rear stage-side holding body is configured so as to hold two cooling fans (the second cooling fan 62B and the first cooling fan 61B) that are successively disposed from the rearmost-stage side of the optical path, and the rear stage-side holding body is detachable in a state where the other cooling fans (the first cooling fan 61A and the second cooling fan 62A) are mounted in the illumination device.

The projector 1 of the embodiment uses a transmissive liquid crystal panel as a light modulator, but may use a reflective liquid crystal panel. Moreover, the projector may use a micromirror-type light modulator, for example, a DMD (Digital Micromirror Device) or the like as a light modulator.

The light modulator of the embodiment employs a so-called three-plate system using three light modulators corresponding to the R-light, the G-light, and the B-light. However, the light modulator is not limited to this, and may employ a single-plate system. Alternatively, the embodiment can be applied also to a projector including two or four or more light modulators.

CROSS REFERENCE TO RELATED APPLICATIONS

This application claims priority to Japanese Patent Application No. 2015-118086 filed on Jun. 11, 2015, the entire contents of which are incorporated by reference herein.

What is claimed is:

1. An illumination device comprising:
a first light source device and a second light source device that emit light in directions opposite to each other in a first direction;
a reflective portion that is disposed between the first light source device and the second light source device, and reflects the light emitted from the first light source device and the second light source device in a second direction crossing the first direction; and
a cooling device that is disposed on one side of the reflective portion in a third direction crossing the first direction and the second direction, and blows cooling air to the first light source device and the second light source device.

2. The illumination device according to claim 1, wherein the cooling device includes a first cooling fan that blows cooling air to the first light source device and a second cooling fan that blows cooling air to the second light source device, and
the first cooling fan and the second cooling fan are disposed along the second direction.

3. The illumination device according to claim 2, wherein the first cooling fan and the second cooling fan are sirocco fans each of which discharges cooling air, taken in in a direction along a central axis of rotation of blades, in a tangential direction of rotation, and include, on the side opposite to the reflective portion, suction ports through which cooling air is taken in, and discharge ports through which the taken-in cooling air is discharged are each disposed facing the side of the first light source device in the first cooling fan and facing the side of the second light source device in the second cooling fan.

4. The illumination device according to claim 3, wherein the first light source device and the second light source device are disposed with the optical axes thereof shifted in the third direction, and the first cooling fan is disposed shifted relative to the second cooling fan in the same direction as a direction in which the first light source device is shifted relative to the second light source device.

5. The illumination device according to claim 3, wherein the first cooling fan and the second cooling fan are disposed such that portions thereof overlap each other.

6. The illumination device according to claim 5, wherein the first cooling fan and the second cooling fan are disposed such that a discharge direction in which cooling air is discharged is inclined to the first direction, and that an angle of the discharge direction with respect to the first direction is smaller than an angle with respect to the second direction.

7. The illumination device according to claim 5, wherein the first cooling fan and the second cooling fan include ventilation portions through which the taken-in cooling air circulates along the tangential direction of rotation, and the ventilation portions are disposed so as to be located between the central axes of rotation of the first cooling fan and the second cooling fan.

8. The illumination device according to claim 2, wherein a plurality of sets of the first light source device and the second light source device are provided along the second direction.

9. The illumination device according to claim 2, wherein two sets of the first light source device and the second light source device are provided along the second direction.

10. The illumination device according to claim 8, wherein the cooling device includes a plurality of the first cooling fans and a plurality of the second cooling fans,
the illumination device includes a rear stage-side holding body that holds one or two cooling fans of the plurality of the first cooling fans and the plurality of the second cooling fans, which are successively disposed from the rearmost-stage side of an optical path in the illumination device, and
the rear stage-side holding body is detachable in a state where the other cooling fans than the cooling fan held by the rear stage-side holding body are incorporated into the illumination device.

11. A projector comprising:
the illumination device according to claim 1;
a light modulator that modulates light emitted from the illumination device; and
a projection optical device that projects the light modulated by the light modulator.

12. A projector comprising:
the illumination device according to claim 2;
a light modulator that modulates light emitted from the illumination device; and
a projection optical device that projects the light modulated by the light modulator.

13. A projector comprising:
the illumination device according to claim 3;
a light modulator that modulates light emitted from the illumination device; and
a projection optical device that projects the light modulated by the light modulator.

14. A projector comprising:
the illumination device according to claim 4;
a light modulator that modulates light emitted from the illumination device; and
a projection optical device that projects the light modulated by the light modulator.

15. A projector comprising:
the illumination device according to claim 5;
a light modulator that modulates light emitted from the illumination device; and
a projection optical device that projects the light modulated by the light modulator.

16. A projector comprising:
the illumination device according to claim 6;
a light modulator that modulates light emitted from the illumination device; and
a projection optical device that projects the light modulated by the light modulator.

17. A projector comprising:
the illumination device according to claim 7;
a light modulator that modulates light emitted from the illumination device; and
a projection optical device that projects the light modulated by the light modulator.

18. A projector comprising:
the illumination device according to claim 8;
a light modulator that modulates light emitted from the illumination device; and
a projection optical device that projects the light modulated by the light modulator.

19. A projector comprising:
the illumination device according to claim 9;
a light modulator that modulates light emitted from the illumination device; and
a projection optical device that projects the light modulated by the light modulator.

20. A projector comprising:
the illumination device according to claim 10;
a light modulator that modulates light emitted from the illumination device; and
a projection optical device that projects the light modulated by the light modulator.

\* \* \* \* \*